Patented July 24, 1923.

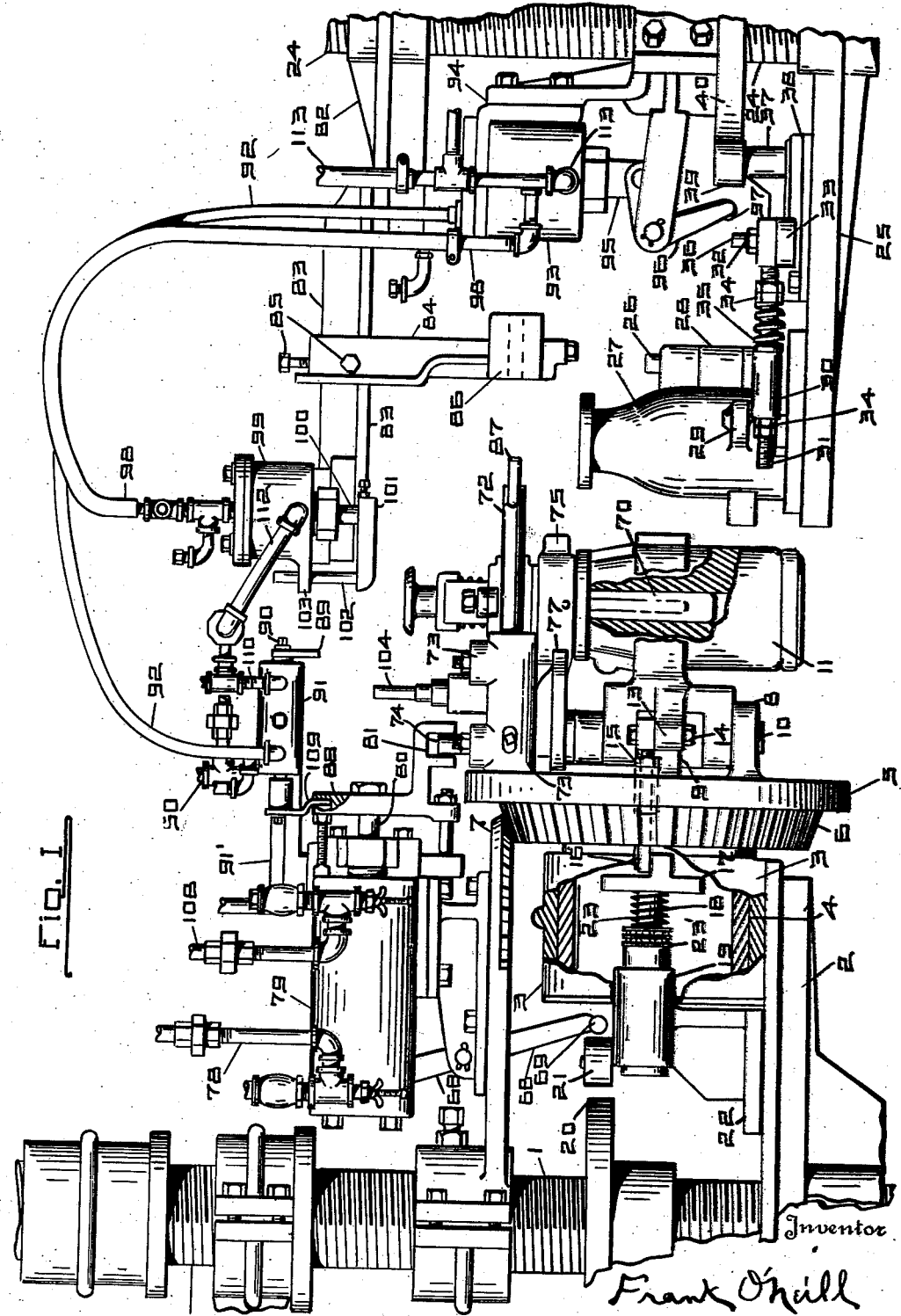

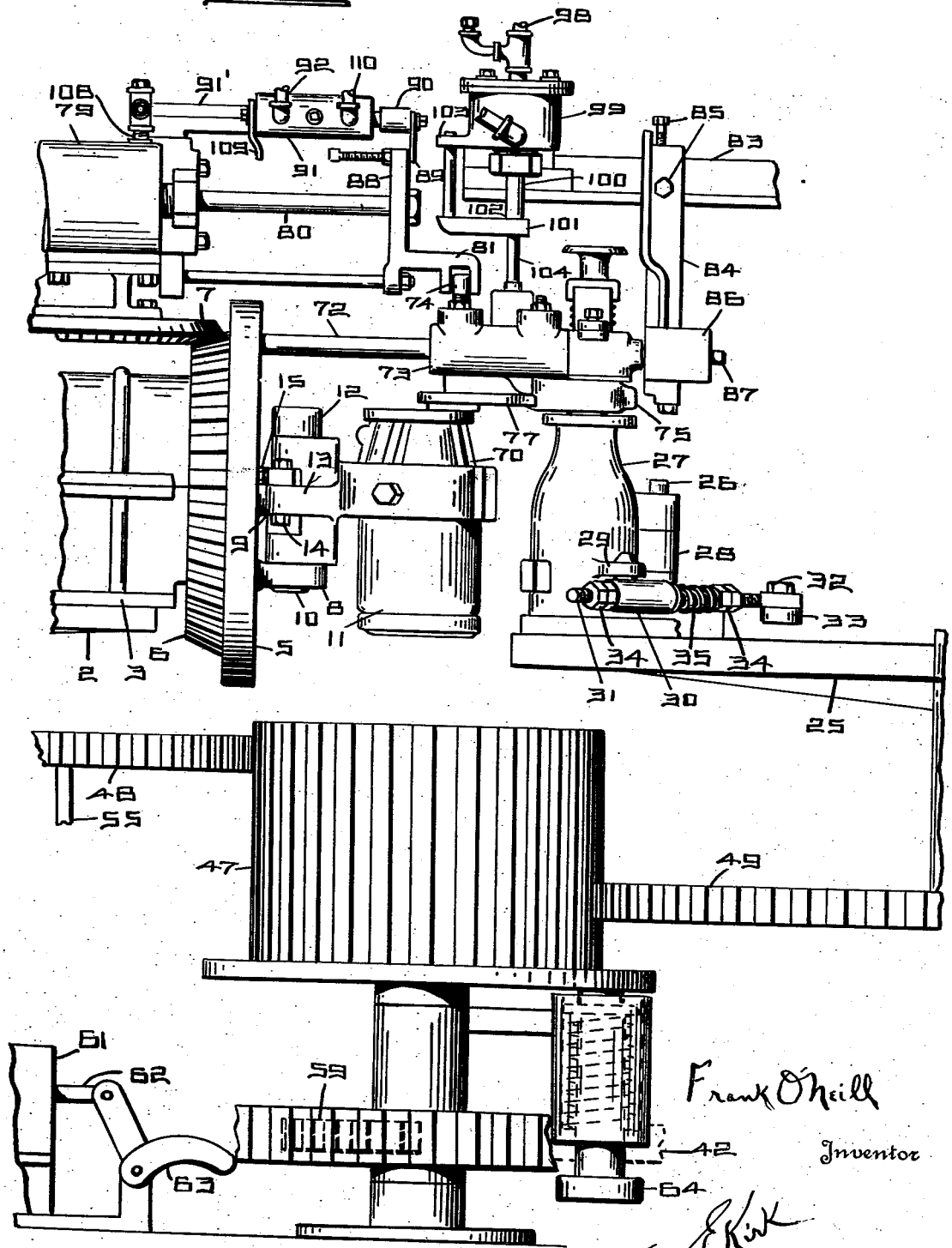

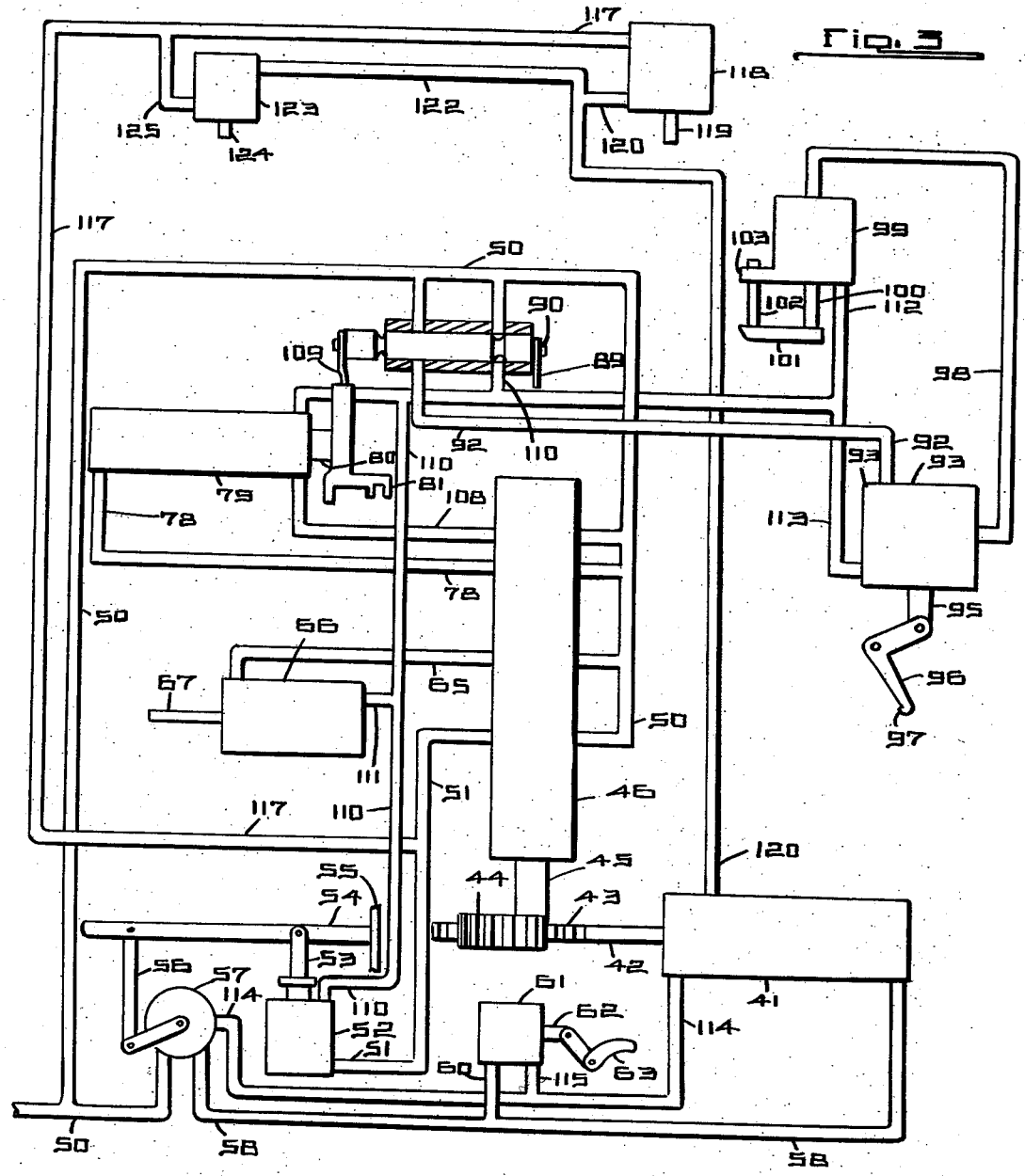

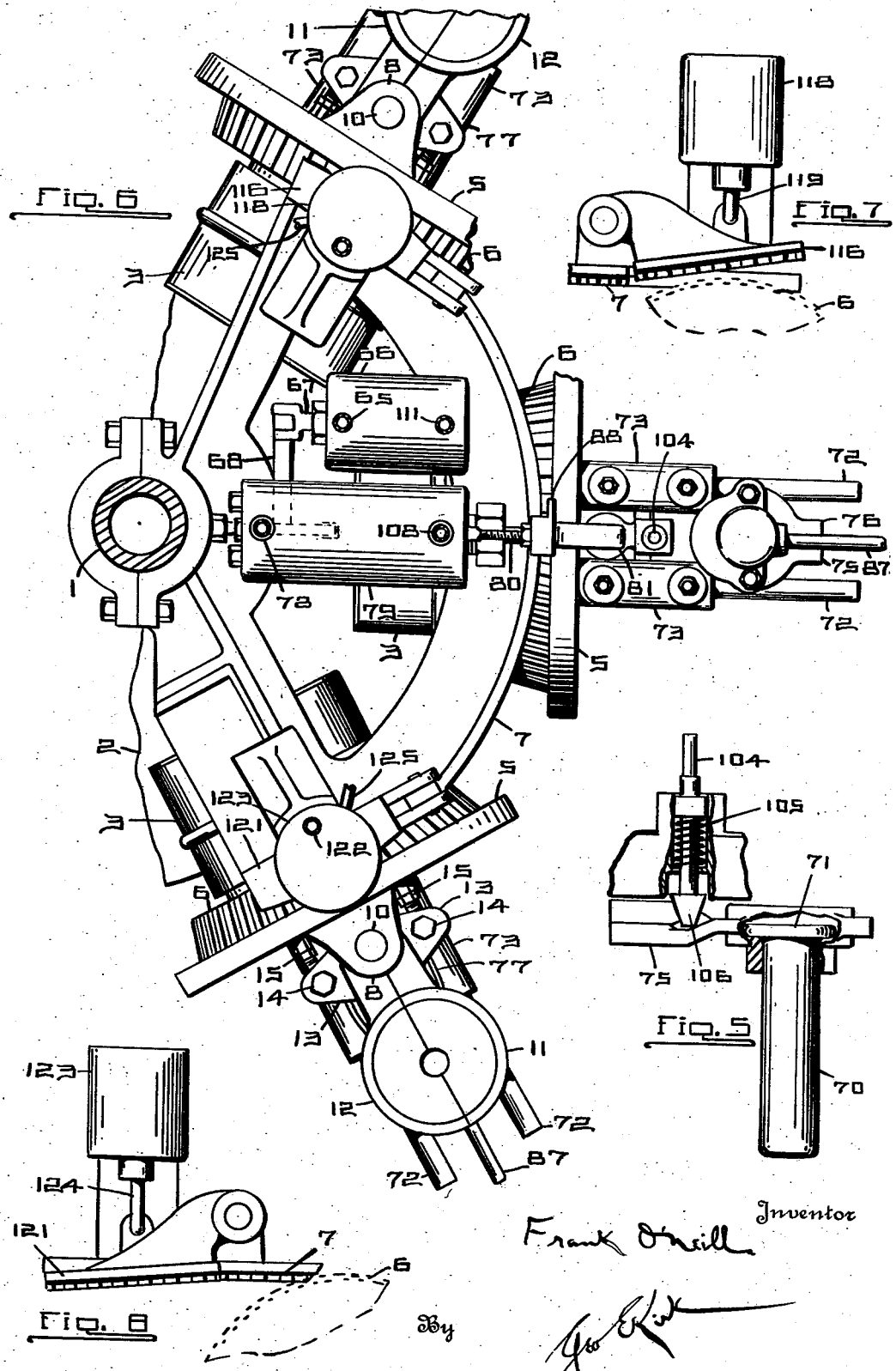

1,462,652

UNITED STATES PATENT OFFICE.

FRANK O'NEILL, OF TOLEDO, OHIO.

GLASS-HANDLING APPARATUS.

Application filed June 14, 1920. Serial No. 388,724.

*To all whom it may concern:*

Be it known that I, FRANK O'NEILL, a citizen of the United States of America, residing at Toledo, Lucas County, Ohio, have invented new and useful Glass-Handling Apparatus, of which the following is a specification.

This invention relates to features of automatic co-operative interrelation in glassware forming apparatus.

This invention has utility when incorporated as a power actuated transfer device between the blank and blow tables of glass bottle automatic machines for forming and blowing such ware, together with features of positively orienting the blank.

Referring to the drawings:

Fig. 1 is a fragmentary view of blank and blow table portions of a glass bottle machine, with an embodiment of the transfer device of this invention therewith, the device being in position ready to effect a transfer of a blank from the blank table to the blow table;

Fig. 2 shows the device of Fig. 1 as transfer has been effected of the blank from the blank mold to the blow or finish mold;

Fig. 3 is a power diagram of the pneumatic control for the transfer device;

Fig. 4 is a plan view of the sectional neck finish portions or transfer effecting holder portions of the blank mold;

Fig. 5 is a detail view, with parts broken away, of the neck finish actuating plunger;

Fig. 6 is a plan view of the blank mold orienting segment;

Fig. 7 is a fragmentary detail view of the receiving portion of the segment of Fig. 6, in open or unclutched position; and Fig. 8 is a fragmentary view of the slowing up or retarding portion of the blank mold orienting segment approaching the fully turned or discharge position.

The bottle machine or glassware forming apparatus is herein shown as comprising a first column 1 carrying a blank table 2 for an annular series of radially disposed bearings 3 having therein barrels 4 outwardly terminating in disks 5. Fixed with the inner side of each disk 5 is a bevel gear 6. The gear 6 is normally out of mesh, and the barrel 4 has no movement as to the bearing 3. However, centrally as to the transfer station, is disposed a stationary gear segment 7 on the column 1. The extent of this segment 7 is such that at its mid position or at the transfer station, the barrel 4 has been oriented 180°.

The disk 5 on its outer side carries aligned eyes or lugs 8, 9, for hinge pin 10 for carrying housings 11, 12, together forming the main or body portion of a blank mold. These housings or mold sections 11, 12, have extensions 13 engaged by pins 14 of adjustable links 15 extending to studs 16 of crosshead 17 in the barrel 4. This crosshead 17 has a stem 18 extending toward the column 1, and through a guide 19. Away from the transfer station, a cam 20 on the column 1 coacts with roller 21 on the guide 19, normally thrusting the guide 19 radially away from the column 1 along slide way 22 of the table 2, thus through helical spring 23 on the stem 18 acting against anti-friction thrust bearing 23', yieldably holding the blank mold sections closed. At the transfer station, the cam 20 is of shorter radius than is necessary to hold the blank mold closed by engaging the roll 21.

The apparatus as herein disclosed comprises a column 24, as a second column eccentric of and such distance laterally from the first column, that blow table 25 rotatable on the column 24, is spaced from the blank table 2 rotatable on the column 1. This blow table 25, like the blank table 2, carries an annular series of molds. The groups herein are six to each table, or at 60° intervals, in intermittent or step by step operation of one table clockwise and the other table counterclockwise to rest at the transfer station, at which point the two columns and a blank and a blow mold are in line.

The blow table 25 for each mold thereon carries a fixed vertical pin 26 as a hinge pin for blow mold sections 27, 28, provided with ears or extensions 29 pivotally carrying cylindrical guide members 30 through which extend rods 31 from pins 32 on crosshead 33. Nuts 34 may adjust springs 35 on the rods 31 in this yieldable link structure. The crosshead 33 has a central upstanding pin 36. The crosshead 33 also has a radially inward extension 37 coacting with a slide way 38 on the blow table 25. Mounted on the extension 37 is a roller 39 coacting away from the transfer and take-off stations with a stationary cam 40 on the column 24, which in thrusting the crosshead 33 outward tends yieldably to hold the blow mold closed on approaching, at, and leaving the blow station.

As a position for starting in considering the cycle of operations of the bottle machine as entering into the coaction with the transfer device of this disclosure, it is assumed that main drive or power cylinder 41 by an inward stroke of its piston rod 42, has brought the tables 2, 25, to a position of rest, with a blank in the blank mold oriented to bring the neck end up, and the blank mold closed. Radially beyond the position of this blank carrying blank mold is a partially open blow mold on the blow table 25. The opening of the blow mold is radially outward from the blow table and thus toward the blank mold. The piston rod 42 carries rack 43 in mesh with segment 44 on stem 45 of main power control valve 46. As the end of the inward or driving stroke of the piston rod 42 is reached completing the 60° step of driving by coacting through the gear 47 in mesh with blank table gear 48 (Fig. 2) and blow table gear 49, power air supply from line 50, may pass (Fig. 3) the main valve 46 and by way of line 51 to cylinder 52, thrusting upward piston rod 53. This piston rod 53 through lever 54 thrusts locking bar 55 upward into blank table holding position, and simultaneously through link 56 shifts rocker valve 57 to permit flow of power air from power air supply line 50 by way of line 58 to the head end of main drive cylinder 41, thereby forcing the piston rod 42 outward in its idle stroke. This stroke is idle, for segment 59 has been unclutched from the gear 47 by power from the line 58, by way of branch line 60 to cylinder 61 in thrusting piston rod 62 outward to rock angle lever 63 to withdraw clutch pin 64 as the pin 64 has traveled with its gear to a position to be engaged by the lever 63. The drawing of the pin 64 downward against spring resistance pulls this pin 64 from engagement with the gear 47, and, recover travel of the segment now occurring, is idle.

In starting in the idle recover outward stroke, the piston rod 42, so shifts the main valve 46 that power air from the line 50 is first permitted to flow by way of line 65 to cylinder 66 at the transfer station on the blank table, causing piston rod 67 to move into cylinder 66 in so rocking lever 68 downwardly extending, that head 69 on the lower end of the lever 68 moves toward column 1 and against roller 21 of the guide 19 to open the main blank mold sections 11, 12.

While this opening of the main housing portions of the blank mold exposes the major portion of the blank, such blank 70 does not drop or fall, for it is sustained by its shoulder 71 at the neck thereof still being engaged (Fig. 5). Outwardly extending from the disk 5 is a pair of parallel rods 72 upon which is mounted a slide member 73 carrying hinge pin 74 pivotally uniting neck finish sections 75, 76, of the blank mold. These sections 75, 76, are normally maintained closed by U-shaped flat spring 77. Accordingly, with the blank main sections 11, 12, open, the neck finish sections 75, 76, may still be closed and by engaging the shoulder 71, thereby suspend the blank 70 in the blank open mold portion.

The further idle travel of the piston rod 42, so shifts the main valve 46 that power air from the line 50 may pass by line 78 to the inner end of cylinder 79 horizontally disposed at the transfer station adjacent the cylinder 66. Piston rod 80, having downwardly open notch 81 is thus thrust radially outward from column 1 of the blank table. In the orienting to position of rest at the transfer station, the disk 5 brings the pin 74 into the notch 81. Accordingly, the outward travel of the notch 81, thrusts the slide member 73 along the rods 72 in carrying the neck finish sections 75, 76, with the suspended blank into the partially open blow mold 27, 28. To insure accurate aligning in this travel of actual shifting of the blank from the blank to the blow mold, there is mounted on the second or blow table column 24 a bracket 82, from which extends auxiliary bracket 83 having adjustably mounted thereon a hanger 84, positioned as to the bracket 83 by adjusting bolts 85, to align guide way 86 with central stem 87 protruding from the member 73 between the rods 72.

As the piston rod 80 nears the limit of its outward travel, upward extension 88 therefrom strikes arm 89, and so shifts stem 90 in valve 91 carried by bracket 91' from the cylinder 79, that power air from the line 50 may pass by way of line 92 to the upper end of cylinder 93 carried by bracket 94 in fixed relation to the column 24 of the blow table. This power air to the upper end of the cylinder 93 thrusts downwardly its piston rod 95 in rocking angle lever 96 to throw its lower head 97 outward against the pin 36 to close finish mold 27, 28, by moving the crosshead 33 outward.

As the piston in the cylinder 93 moves downward to approximately the end of its stroke, the power air in the cylinder 93, which has served to cause a closing of the blow mold about a blank 70 suspended therein, may pass by a lateral port uncovered by the piston in the cylinder 93, through line 98 to the top of cylinder 99 on the radially remote end of auxiliary bracket 83 beyond the hanger 84. Piston rod 100 is accordingly moved downward out of the cylinder 99 and in this downward travel carries shoe 101, having parallel with the rod 100, a guide pin 102 coacting with eye 103 from the cylinder 99.

With the member 73 outward at the position for holding a blank 70 in a closed blow mold 27, 28, the downward travel of the shoe or bar 101, strikes plunger 104, and moves it downward against the resistance of helical spring 105, to force lower wedge shaped head 106 of this plunger 104 between inclined faces 107, of the neck finish sections 75, 76, thereby forcing these sections to swing apart on their hinge pin 74, against the resistance of the spring 77. The blank 70 thus has its shoulder 71 released, and thus while the main portion of the blank is in the blow mold, the final blank mold sections move away therefrom.

Continued travel of the piston 42 has now so shifted the main valve 46 that power air from the line 50 passes by line 108 to the outer or piston rod end of the cylinder 79, thereby causing the piston rod 80 to move into the cylinder 79, and through the notch 81 engaging the pin 74, the slide member 73 is pulled along the rods 72 back to position against the disk 5. In this travel, the shoe or bar 101, bearing against the plunger 104, keeps the neck finish sections 75, 76, open until such sections have cleared the neck 71 of the blank dropped or deposited in the finish mold 27, 28. As the plunger 104 rides clear of the bar 101, the spring 105, shoots the plunger 104 upward, clearing the wedge head 106 from the inclined faces 107. The spring 77, then at once closes the sections 75, 76.

This inward travel of the piston 80 with its upper extension 88, causes this extension 88 to strike arm 109 effecting a reverse travel of the stem 90 in the valve 91, thereby allowing power air from the line 50, to flow by way of line 110 to the upper end of the lock bar cylinder 52. The blank table 2 is thus released at once the transfer device is returned and fully clear of the blow table. Simultaneously with this release of the table 2, branch line 111 from the power line 110, to the head end of the cylinder 66, moves the piston rod 67 therefrom, and thereby rocks the lever 68 so that its lower head 69 is away from the roller 21. The cam 20 in the rotation of the table 2 may now shift the roller 21 as the table carries the barrel with its disk and blank mold away from the transfer station, and the head 69 is in position to open the next blank mold arriving at the transfer station. Branch line 112 from the line 110, extends to the lower end of the cylinder 99, and lifts the shoe or bar 101, so that the next blank carrying neck finish arriving at the transfer station may be thrust outward to carry a blank into a blow mold and have the pin 104 of such neck finish slide clear this bar 101. Branch line 113 from the line 112, extends to the lower end of the cylinder 93, resetting the rock lever 96 by drawing the head 97 of the lever 96 inward away from the pin 36 on the crosshead 33. Accordingly the next blow mold arriving at the transfer station may be in partially open position, sufficiently to allow a blank to be introduced therein, as controlled by the cam 40 acting on the roller 39. The cylinder 93 may then effect final closing of the finish mold in the repetition of the cycle of operations as hereinbefore described. The withdrawal of the lock bar 55, by pulling the piston rod 53 into the cylinder 52, so shifts the rocker valve 57, that power air from the line 50 may pass to the main power cylinder 41 by way of line 114, to bring about the driving stroke travel in moving the piston rod 42 into the cylinder 41.

The operations at the various stations of gathering, blank forming, as well as completion of the neck finish, may occur up to the transfer station, while from the transfer station there may be the final blowing and take off. These operations may be by mechanisms somewhat analogous to U. S. Patent 1,315,983 of Sept. 16, 1919, to Frank O'Neill.

In the general resetting of the parts effected by the power air in finally starting the cylinder 41 on the drive stroke, there is also effected a resetting of the arm 63, by air from branch line 115 in connection with the line 114. Accordingly at the end of the driving stroke, the angle lever 63 may be thrown as hereinbefore described for unclutching the segment for the idle recover stroke during which the transfer operations have been set forth as taking place herein.

Rapidity or speed of operation is a material factor for output cost reduction, and to the end that accurate and positive orienting of the blank to the transfer, as well as general high speed of the machine may be safely conducted, the segment 7 is shown as having pivoted thereto a receiving or clutch toothed section 116 giving such segment with this section 116 an extent slightly in excess of the step or 60° travel distance to the transfer station from the station bringing the blank to the transfer station. Accordingly, when power air in the line 51 (Fig. 3) acts to lock the tables of the bottle machine against rotation, branch air line 117 from this line 51 to the upper end of cylinder 118 causes piston rod 119 to descend therefrom and throw the segment or toothed section 116 (Figs. 6, 7), down upon bevel gear 6 which has just come to rest 60° from the transfer station. The blank carrying blank mold is thus clutched into full driving connection with the segment 7 for rotation upon the next 60° driving travel of the blank table 2 in shifting such blank carrying blank mold to the transfer station. This clutch stays down until the gear 6 has rolled therefrom under the main section 7. When the piston in the main drive cylinder 41 has shifted the gear 6 sufficiently to be away from the toothed section 116, air line 120 from a port in the side of the cylinder 41 allows passage of power air from this cylinder 41 to the lower end of the cylinder 118, this drawing up toothed section 116 so that the next gear 6 may come to this station unclutched and not rotated, and be clutched only after the table has come to rest. This mode of orienting the blank in the blank mold insures a complete and positive holding during the full 180° rotation to the mid position at the transfer station.

The segment 7 at its remote terminus from the section 116, has a similar section 121 coacting with the empty blank mold as such blank mold is brought to the charging or neck finish down position which it had under the section 116. The air line 120 has a branch line 122 to cylinder 123, to throw piston rod 124 out or downward therefrom, thus depressing the toothed section 121 as the section 116 is lifted. This action or position of the section 121 pneumatically held, provides a yieldable brake or retarding means for the empty blank mold as it approaches its second 180° rotation end in travel from the transfer station. As the gear 6 (Fig. 8) completes its 60° step from the transfer station, the entire machine is slightly slowed up pneumatically and the momentum is taken up without concussion as the final righted position of rest is reached by the empty blank mold in its first 60° travel from the transfer station. This toothed section extends to slightly overlap this first 60° station after the transfer station on the blank table, and thus the section 121 holds the empty mold after arriving at the stopped position. However, before the next travel interval, and simultaneously with the clutching action of the toothed section 116, air line 125 as a branch from the line 117, extends to the lower end of this cylinder 123 to unclutch the gear 6 by lifting the segment or toothed section 121 clear thereof. Accordingly the full orienting travels of each blank mold are always positively controlled. There may be no concussions of impact after starting of the table or tables, as the clutches insure simultaneous pick-up.

What is claimed and it is desired to secure by Letters Patent is:

1. A glassware manufacturing apparatus comprising traveling sectional molds, driving means to bring a pair of molds into opposing relation open toward each other, and means carried with one of the molds providing a guide toward the other mold, one of said open molds having a pair of ware engaging shiftable members mounted on the guide means for engaging an article in one mold, shifting said article out of said mold by travel of the members along the guide means and member coacting means releasing the article into the other mold by opening of the members.

2. Glassware manufacturing apparatus comprising a pair of mold carriers, sectional molds mounted on the carriers and openable toward each other, driving means for bringing a pair of open molds into opposing positions of rest, and guide means carried with one of the open molds and directed toward the other open mold, said mold having said means including a pair of members movable along the guide for shifting ware between said molds.

3. Glassware apparatus comprising a traveling carrier, a sectional mold having top and bottom portions, a rotatable mounting for the mold to reverse the positions of the top and bottom portions thereof as to the carrier, a stationary means for effecting mold rotation as to the carrier during carrier travel, driving means for the carrier providing stations of rest, and an engaging device movable relatively to the stationary means at a station of rest for connecting the stationary means to the mounting.

4. Glassware apparatus comprising a traveling carrier, a mold, a rotatable mounting for the mold as to the carrier, stationary means for effecting mold rotation as to the carrier during relative carrier travel, driving means for the carrier providing stations of rest, and a disengaging device movable relatively to the stationary means at a station of rest for disconnecting the stationary means from the mounting.

5. Glassware forming apparatus comprising a carrier, a mold, a rotatable mounting for the mold as to the carrier, rotation effecting means for the mounting during relative travel of the carrier, driving means providing stations of rest as between the rotation effecting means and carrier, and controlling devices between the mounting and the rotation effecting means and movably relatively to the rotation effecting means for holding the mounting.

6. Glassware apparatus comprising a traveling carrier, a mold, a rotatable mounting for the mold as to the carrier, stationary means for effecting mold rotation as to the carrier during relative carrier travel, driving means for the carrier providing stations of rest, and a yieldable slow-up device coacting between the mounting and stationary means for checking carrier travel.

7. Glassware apparatus comprising a traveling carrier, a mold, a rotatable mounting for the mold as to the carrier including a gear, a stationary rack in the line of travel of the gear for rotating the gear, driving means for the carrier providing a station of rest for the mounting clear of the rack, and a device movable relatively to the stationary rack and including a toothed section operable to connect the rack with the gear at said station of rest.

8. Glassware apparatus comprising a traveling carrier, a mold, a rotatable mounting for the mold as to the carrier including a gear, a stationary rack in the line of travel of the gear for rotating the gear, driving means for the carrier providing a station of rest for the mounting, and a device movable relatively to the stationary rack and including a toothed section operable to disengage the gear at said station of rest and slow up carrier travel of the mounting as leaving the rack and reaching said device.

FRANK O'NEILL.